April 4, 1967 H. M. LEONHARDT 3,311,936
LAST EJECTOR

Filed Nov. 12, 1964 6 Sheets-Sheet 1

INVENTOR.
Horst M. Leonhardt
BY Albert Gordon
ATT'Y

United States Patent Office 3,311,936
Patented Apr. 4, 1967

1

3,311,936
LAST EJECTOR
Horst M. Leonhardt, Randolph, Mass., assignor to Jacob S. Kamborian, West Newton, Mass.
Filed Nov. 12, 1964, Ser. No. 410,566
7 Claims. (Cl. 12—127)

In pending application Ser. No. 353,462 filed Mar. 20, 1964, there is disclosed a lasting machine that includes a mechanism for ejecting a last from a shoe support after the completion of the lasting operation. The shoe support of the machine supports bottom-up a shoe assembly that includes a last having an upper mounted thereon and an insole located on its bottom. The machine includes a hold-down movable from an out-of-the-way position to a position above the support, a pad movable against the last to press the upper against the last and wipers movable across the bottom of the shoe assembly in a wiping stroke to wipe the margin of that portion of the upper engaged by the pad against the insole. In the operation of the machine, the shoe assembly is placed on the support, the hold-down is moved from its out-of-the-way position to its position above the support, the support is then raised to clamp the shoe assembly between the support and the hold-down, the pad is then moved against the last and the wipers are then moved through their wiping stroke. At the completion of the wiping stroke the aforementioned instrumentalities of the machine are returned to their initial positions and the last is ejected from the support by the last ejecting mechanism.

The present invention provides for an improved last ejector that is operated automatically in response to the return of the machine instrumentalities to their initial positions. The support includes a last pin that enters a hole in the last. The ejector comprises a ledge and lug positioned alongside the pin. A motor is connected to the ejector in such a manner as to first impart upward translatory movement to the ejector so as to cause the ledge to raise the last clear of the last pin and to then swing the ejector transversely of the last pin so as to cause the lug to engage the last and eject it laterally of the last pin. The motor is actuated to operate the ejector in response to the return of the hold-down to its initial position.

2

Figure 14:
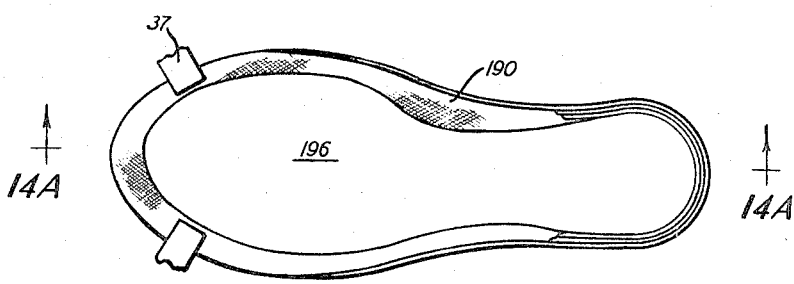
Figure 14A:
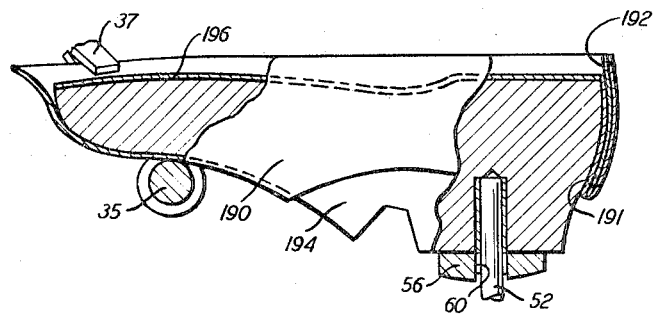
Figure 19:
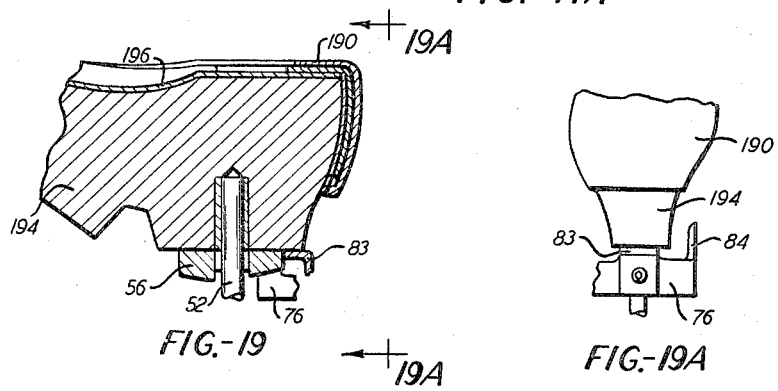
Figure 19A:
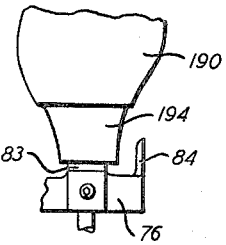
Figure 15:
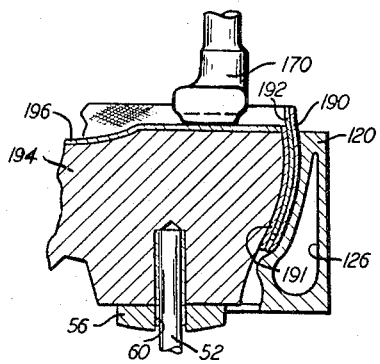
Figure 16:
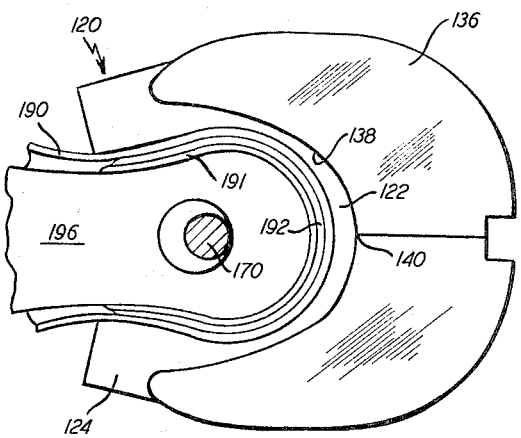
Figure 17:
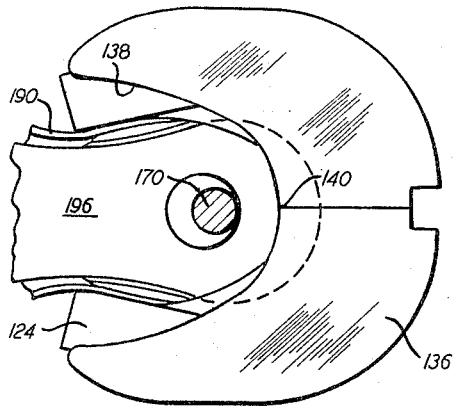
Figure 18:
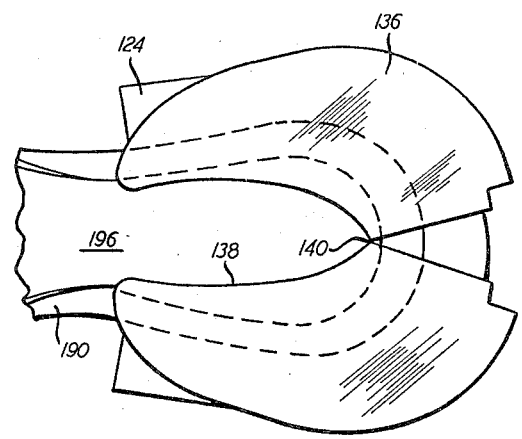

FIGURE 14 is a top view of the shoe assembly as it appears at the beginning of the machine cycle;

FIGURE 14A is a view taken on the line 14A—14A of FIGURE 14;

FIGURE 15 is a section showing the shoe assembly after it has been clamped between the hold-down and shoe support;

FIGURE 16 is a top view of the shoe assembly after it has been engaged by the pad and before the wipers begin their wiping stroke;

FIGURE 17 is a top view of the shoe assembly showing the wipers part way through their wiping stroke;

FIGURE 18 is a top view of the shoe assembly showing the wipers as having completed their wiping stroke;

FIGURE 19 is a section in elevation of the shoe assembly showing the ledge engaging the last during its translatory upward movement; and FIGURE 19A is a view taken on the line 19A—19A of FIGURE 19.

Figure 1:
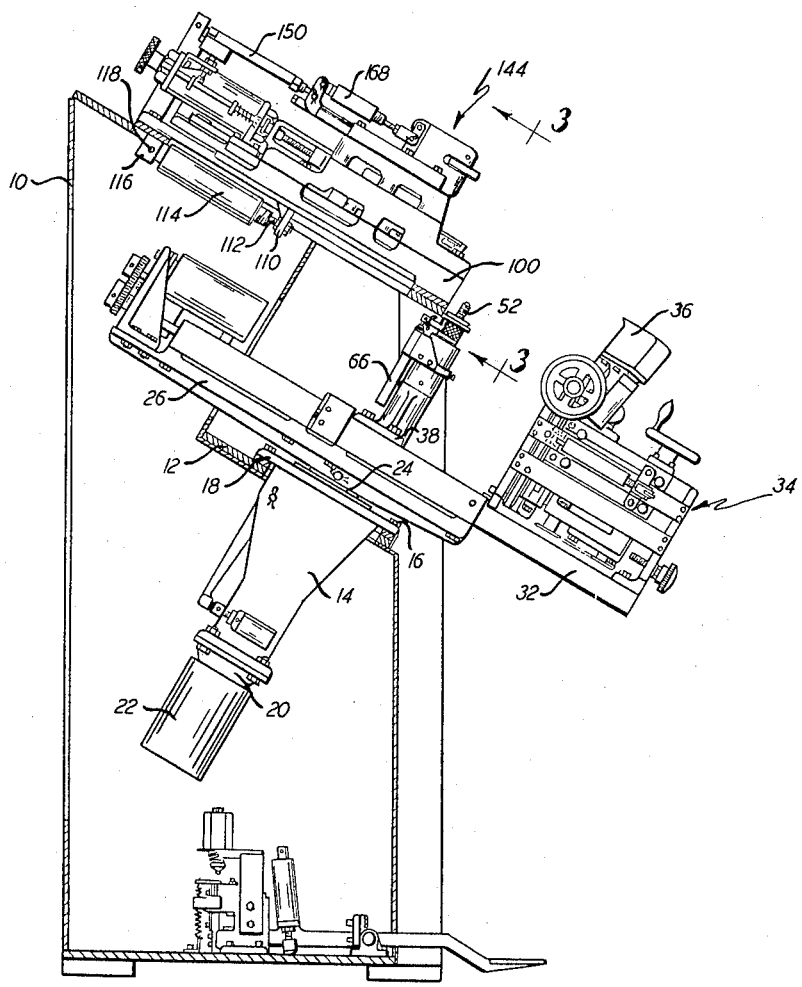
FIGURE 1 is a side elevation of the machine.

Referring to FIGURE 1, the machine includes a frame 10 that comprises a base 12 and a housing 14. The machine is tilted about 30 degrees to enable the operator to have ready access thereto. For ease of explanation, the direction of the base 12 will be referred to as horizontal and the direction of the housing 14 will be referred to as vertical. In operating the machine, the operator stands to the right of the machine as seen in FIGURE 1, and parts moving toward the operator (left to right in FIGURE 1) will be described as moving forwardly while parts moving away from the operator (right to left in FIGURE 1) will be described as moving rearwardly.

The housing 14 is secured to the base 12 by bolts 16 extending through a flange 18 of the housing that are threaded into the housing. A hanger 20, bolted to the bottom of the housing 14, has a vertically extending air operated motor 22 secured thereto. The piston rod (not shown) of the motor 22 is connected to a post 24 (FIGURE 2) that is slidably mounted in the housing 14 and that extends upwardly of the housing.

Figure 2:
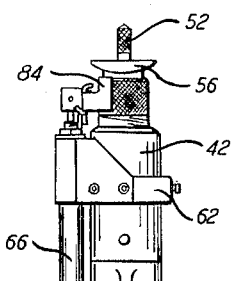
FIGURE 2 is a side elevation of a portion of the machine that includes the shoe assembly support and last ejector.
Figure 2:
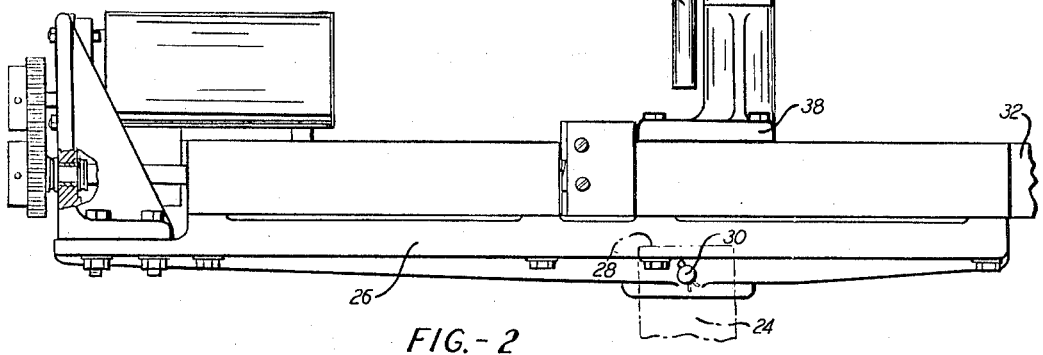

Referring to FIGURES 1 and 2, a shoe supporting platform 26 has a socket 28 in its bottom which receives the top of the post 24, and the platform and post are connected by a pin 30. A horizontally extending base 32 is mounted on the platform 26.

The rear of the base 32 has a framework 34 extending upwardly thereof. A toe rest 35 and two pincers 37 are incorporated in the framework (see FIGURES 14 and 14A).

Figure 9:
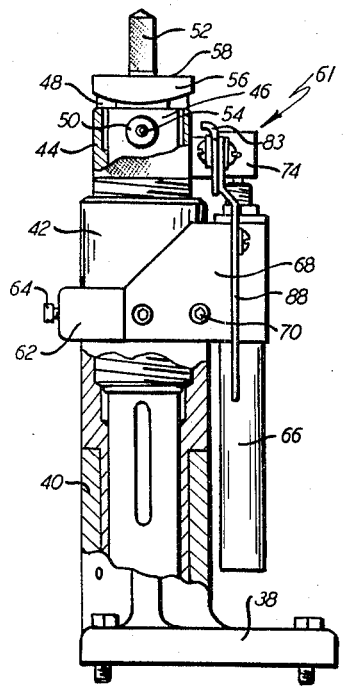
FIGURE 9 is a view taken on the line 9—9 of FIGURE 8.
Figure 8:
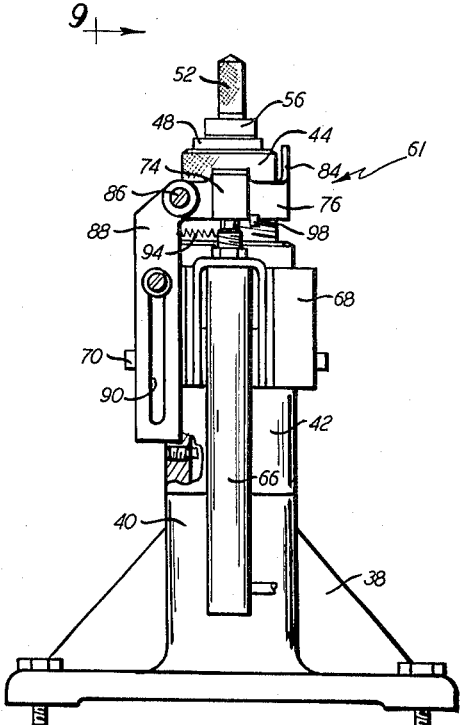
FIGURE 8 is an elevation of the shoe assembly support and last ejector.
Figure 10:
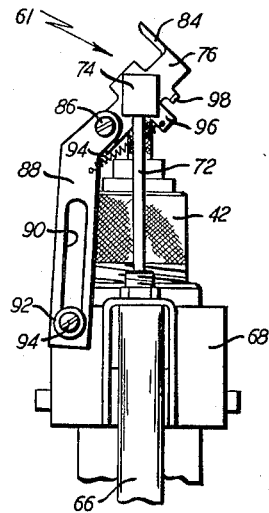
FIGURE 10 is a view similar to FIGURE 8 showing the last ejector after it has been moved upwardly and transversely of the last pin.
Figure 11:
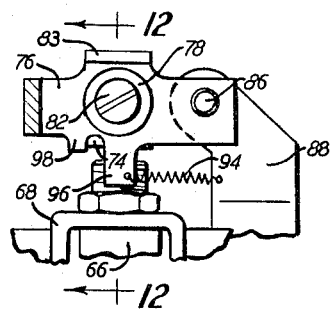
FIGURE 11 is a view to an enlarged scale of the ejector.
Figure 12:
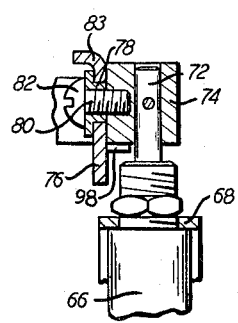
FIGURE 12 is a section taken on the line 12—12 of FIGURE 11.

The platform 26 has a base 38 secured thereto. Referring to FIGURES 8 and 9, the base 38 comprises a hollow tubular portion 40 that rises vertically from the platform 26 on a vertical axis that is forward of the vertical axis of the post 24. A hollow column 42 is seated on and locked to the tubular portion 40. A hollow sleeve 44 is screwed into the column 42 and extends upwardly thereof. A last pin holding tube 46 is located within the sleeve 44 and is seated on the sleeve by means of shoulders 48 at the top of tube. A bar 50 is seated in a pair of radial openings in the tube 46 and a last pin 52 extends through a vertical hole in the bar 50 and is secured to the bar by set screws 54, as shown more clearly in the aforementioned application Ser. No. 353,462. The top of the tube 46 has a concave upper surface that receives the lower convex surface of a shoe assembly supporting plate 56. The plate 56 has a flat upper surface 58 and a hole 60 (FIGURE 14A) through which the last pin 52 extends.

A last ejector 61 is mounted on the column 42. Referring to FIGURES 8-12 the last ejector includes a collar 62 fastened to the column 42 by a set screw 64. A spring return air operated motor 66 is secured to a bracket 68 that is connected to the collar 62 by set screws 70. The motor 66 is located adjacent to and rearwardly of the column 42. The upwardly extending piston rod 72 of the motor 66 is pinned to a block 74. The block 74 is pivotally connected to a strut 76 by means of a bearing 78 mounted for relative rotation with respect to the strut in a hole in the strut and a screw 80 that extends through the bearing 78 and is threaded into the block 74 with the head 82 of the screw positioned against the bearing (see FIGURE 12). A ledge 83 at the top of the strut 76 extends inwardly thereof over the screw head 82. The strut 76 extends transversely of the longitudinal center line of the machine and has an upstanding lug 84 at one end. The other end of the strut 76 is pivoted by a pivot pin 86 to the upper end of a bar 88 that extends downwardly of the pivot pin 86. The bar 88 has an elongated slot 90 therein. A bearing 92, similar to the bearing 78, is fitted into the slot 90 and a screw 94, similar to the screw 80, extends through the bearing 92 and is threaded into the bracket 68 with the head of the screw 94 positioned against the bearing 92 to enable the slot 90 of the bar 88 to move heightwise with respect to the bracket 68 and to also enable the bar 88 to swing with respect to the bracket 68 about the axis of the screw 94. The bearing 92 and slot 90 thus form a lost motion connection. A tension spring 94, extending between the bar 88 and a downwardly extending tang 96 of the strut 76, acts to yieldably urge the strut 76 downwardly about the axis of the pin 86 to a horizontal position where a finger 98 on the strut 76 engages the block 74.

Figure 3:
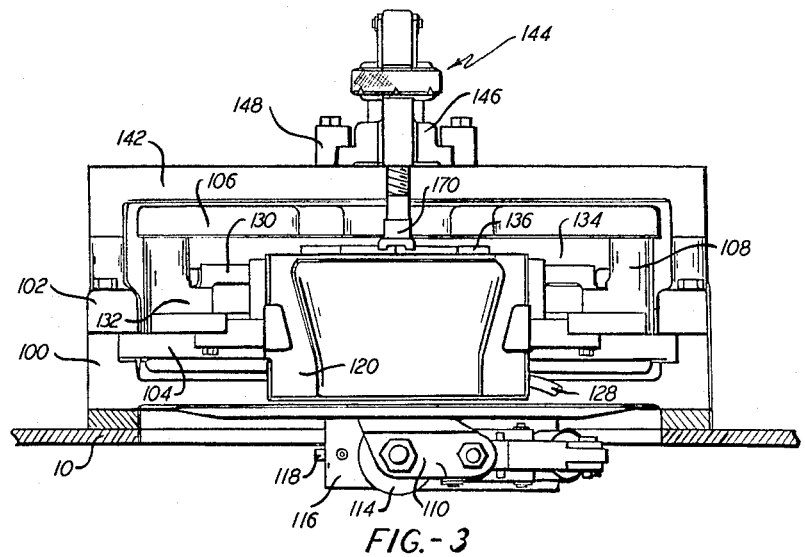
FIGURE 3 is a view taken on the line 3—3 of FIGURE 1.

As shown in FIGURES 1 and 3, a head 100 is mounted on the frame 10 rearwardly of the framework 34 and the last pin 52. The head 100 and gibs 102 that are bolted to the head form a guideway that receives a main slide plate 104. A cover 106 is spaced above the plate 104 at its forward end and is connected to the plate 104 by means of spacers 108. The plate 104 has a lug 110 depending therefrom that is bolted to the piston rod 112 of an air actuated motor 114 and the motor 114 is connected to a hanger 116 depending from the fram 10 by a pin 118.

A U-shaped pressing or clamping pad 120 is provided that is made of an expandable, deformable material such as rubber (FIGURES 3, 15 and 16). The pad has a bight 122 and a pair of legs 124 extending forwardly of the bight. The pad, which is constructed similarly to that shown in pending application Ser. No. 262,874 filed Mar. 5, 1963, has a cavity 126 (FIGURE 15) into which pressurized fluid such as air may be forced by way of a line 128 (FIGURE 3) to expand the inner walls of the pad. The pad 120 is mounted on the main slide plate 104 in the manner disclosed in the aforementioned application Ser. No. 353,462.

A wiper supporting slide plate 130 (FIGURE 3) is slidably mounted for forward and rearward movement on shoulders 132 on the spacers 108 above the main slide plate 104. Wiper cams 134, resting on the plate 130 immediately below the cover 106, have wipers 136 (FIGURE 16) mounted thereon. The wipers have side surfaces 138 that diverge forwardly from a vertex 140. Means disclosed in the aforementioned application Ser. No. 353,462 are provided in the machine to drive the wipers in the manner described below.

Figure 4:
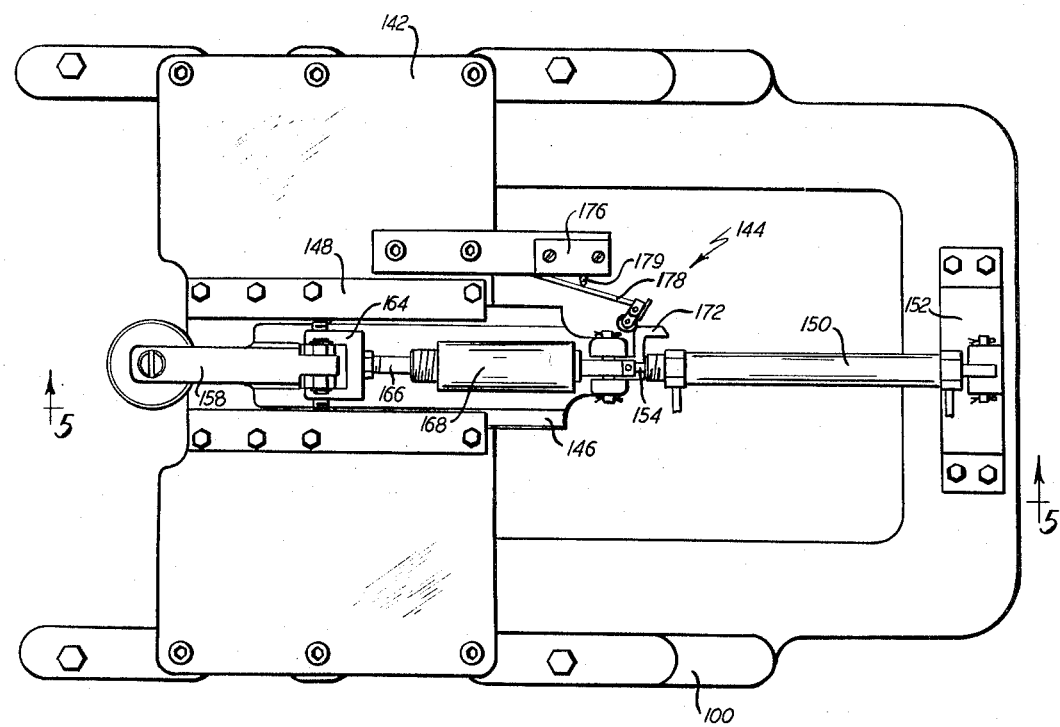
FIGURE 4 is a plan view of the hold-down.
Figure 5:
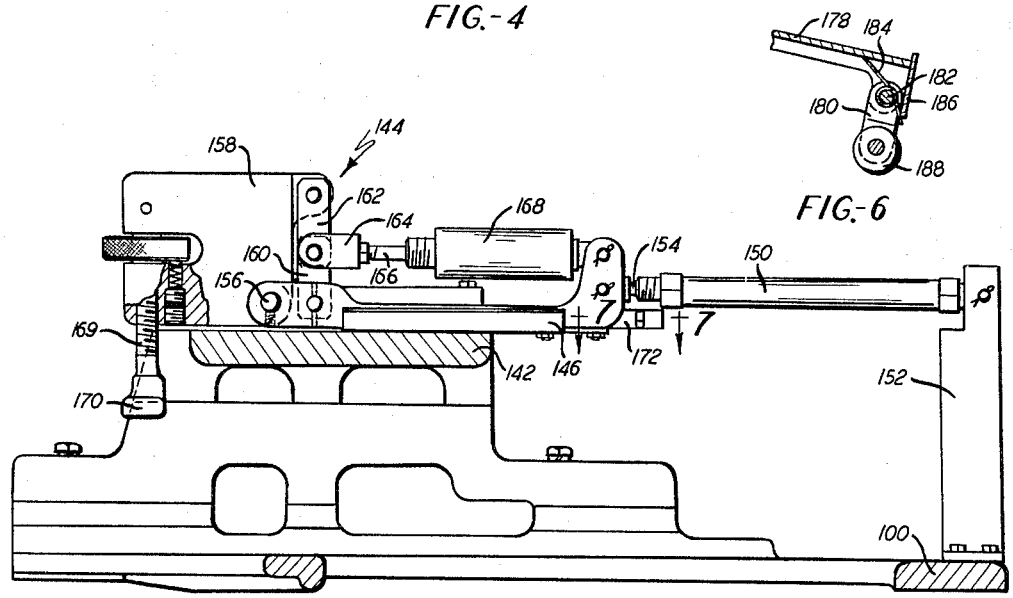
FIGURE 5 is a view taken on the line 5—5 of FIGURE 4.

The head 100 has a cover 142 that overlies the cover 106 and supports a hold-down unit 144. As shown in FIGURES 4 and 5, the unit 144 includes a slide 146 that is constrained for forward and rearward movement on the cover 142 by gibs 148 bolted to the cover. An air actuated motor 150, mounted on a flange 152 that is secured to the head 100, has a piston rod 154 that is connected to the slide 146. The forward end of the slide 146 is pivoted through a pin 156 to a block 158. A toggle link 160 is pivoted to and extends upwardly of the slide 146. A toggle link 162 is pivoted to and extends downwardly from the block 158. The adjoining ends of the toggle links 160 and 162 are pivoted to a clevis 164 that is mounted on the piston rod 166 of an air actuated motor 168. The motor 168 is mounted on the slide 146. A hold-down 169 is mounted in and extends downwardly of the block 158. A hold-down foot 170 is located at the bottom of the hold-down 169.

Figure 7:
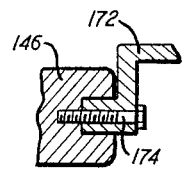
FIGURE 7 is a view taken on the line 7—7 of FIGURE 5.
Figure 6:
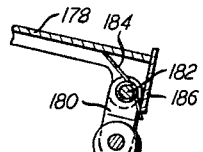
FIGURE 6 is an enlarged view of a part of the mechanism for actuating the last ejector motor.

A cam 172 is fastened to the slide 146 by a bolt 174 (see FIGURE 7) and extends rearwardly of the slide below the motor 150. A valve 176, mounted on the cover 142, has an arm 178 pivoted thereto (FIGURES 4 and 6). As is conventional with valves of the type of the valve 176, the cam 178 is yielding urged away from the valve 176 by a spring pressed plunger 179 on the valve. The arm 178 has a finger 180 pivoted thereto by a pin 182. The finger 180 is yieldably urged counterclockwise (FIGURE 6) about the pin 182 by a spring 184 to the position shown in FIGURE 6 wherein a lip 186 on the finger 180 engages the arm 178. A roller 188 on the finger 180 is in alignment with the cam 172.

In the idle condition of the machine, the post 24 is maintained by the motor 22 in a lowered position to maintain the last pin 52, shoe assembly supporting plate 56, the toe rest 35 and the pincers 37 in a lowered position, the piston rod 72 is retracted into the motor 66 to maintain the last ejector 61 in the FIGURES 8 and 9 position with the lug 84 below the last pin 52 and plate 56, the piston rod 112 is retracted into the motor 114 to maintain the main slide plate 104 in a rearward position, the legs 124 of the pad 120 are maintained in an open position, there is no pressurized fluid in the line 128 so that the pad 120 is deflated, the wiper supporting slide plate 130 is in a rearward position with respect to the main slide plate 104 and the wipers are in a rearward open position as indicated in FIGURE 16, the piston rod 154 is retracted into the motor 150 so that the slide 146 and the hold-down unit 144 are in a rearward out-of-the-way position and the piston rod 166 is projected out of the motor 168 so that the hold-down foot 170 is in a relatively lowered position.

Although the machine has general utility in stretching an upper over a last and wiping the heel of the upper against an insole, it is herein disclosed as performing the method disclosed in Patent No. 3,144,670 wherein the heat softenable counter disclosed in said patent and in application Ser. No. 134,641 filed Aug. 29, 1961, now abandoned, is utilized.

A shoe upper 190 (FIGURES 14 and 14A) is provided having a liner 191 united thereto at the heel end of the upper. A counter 192 is inserted between the upper 190 and the liner 191 with an exposed portion of the counter extending upwardly of the upper edge of the liner and a concealed portion lying between the liner and the upper. The counter is made of a homogeneous thermoplastic material and has the characteristic of being stiff and rigid at ambient temperatures, of becoming soft and flaccid when heated above a predetermined temperature and of reverting to its stiff and rigid state when cooled back to ambient temperatures. The counter is coated on both of its surfaces with a thermoplastic adhesive which becomes sticky or tacky when heated above said predetermined temperature and reverts to its normal rigid, cohesive condition when cooled below the predetermined temperature back to ambient temperature.

The counter, upper and liner assembly is heated to a temperature sufficient to render the counter soft and flaccid. This may be done in apparatus similar to that disclosed in Patent No. 3,115,651. This assembly is then draped about a last 194 (FIGURES 14 and 14A) having an insole 196 mounted on its bottom to form a shoe assembly. The shoe assembly is placed bottom-up on the shoe assembly supporting plate 56 with the last pin 52 entering the conventional last pin hole in the last. The toe portion of the upper and last is supported on the toe rest 35 and the forepart portions of the upper margin are inserted between the jaws of the pincers 37. At this time the upper end of the liner 191 is substantially level with the insole 196 and the upper surfaces of the counter 192 and upper 190 at the heel end of the last extend above the insole as indicated in FIGURE 14A.

The machine control disclosed in the aforementioned application Ser. No. 353,462 is now actuated by the operator to cause the pincers 37 to grip the forepart portions of the upper margin. At this point the operator may inspect the work to see if the pincers are properly gripping the upper margin. If they are not, he may cause the pincers to open. If the upper margin is being properly gripped by the pincers, the pincers are caused to move forwardly to thereby horizontally stretch the upper in the direction of the toe of the last and cause a firm wrapping of the upper about the heel of the last and a tension force on the counter to start to mold it to the shape of the last. At this point the operator may again inspect the work and return the parts to their original position if the upper is not being properly engaged by the pincers and stretched about the heel of the last.

The operator, assuming he is satisfied with the condition of the work in the machine, now actuates the machine control to enable the machine to go through the rest of its cycle automatically. The motor 150 is thereby actuated to move the hold-down unit 144 forwardly to move the hold-down 169 from its out-of-the-way position to a working position above the shoe and last bottom. Prior to this time in the machine cycle the hold-down had been in its rearward out-of-the-way position so as not to interfere with the placement of the shoe assembly on the last pin 52 and plate 56 and also so as to not interfere with the operator's observing whether the upper was properly gripped by the pincers 37 and whether the upper was properly stretched about the heel of the last as a result of the forward horizontal stretching movement of the pincers. During the forward movement of the hold-down unit 144, the cam 172 engages the roller 188 to thereby swing the finger 180 clockwise (FIGURE 6) about the pin 182 against the force of the spring 184 without affecting the valve arm 178 or valve 176. After the cam 172 has moved forwardly of the roller 188, the spring 184 returns the finger 180 to the FIGURE 6 position.

Now the motor 22 is actuated to raise the post 24 together with the last pin 52, last supporting plate 56 and the toe rest 35 and pincers 37 until the insole 196 bears against the hold-down foot 170. The bottom of the hold-down foot 170 is located slightly below the level of the undersurfaces of the wipers 136 so that the raising of the shoe assembly by the actuation of the motor 22 brings the insole to the level of the bottom of the hold-down foot regardless of the height of the last or the thickness of the insole and clamps the shoe assembly between the plate 56 and the hold-down foot 170.

After this the motor 114 is actuated to move the main slide plate 104 forwardly and thereby move the clamping pad 120 and wipers 136 forwardly from their out-of-the-way position until the bight 122 of the pad engages the heel end extremity of the shoe assembly after which the plate 104 is locked in position by the mechanism shown in the aforementioned application Ser. No. 353,462.

The main slide plate 104 had been maintained in its retracted out-of-the-way position up to this time so as to enable the operator to inspect the shoe assembly during the gripping of the upper margin by the pincers 37 and the horizontal stretching movement of the pincers without interference by the heel clamp 120 and the wipers 136. In addition, the maintenance of the heel clamp and the wipers in their out-of-the-way position enables the motor 22 to raise the shoe assembly without interference with the heel clamp and wipers.

After the locking of the main slide plate 104, the pincers 37 are caused to move vertically and thus apply an upward tension to the upper margin at its forepart portions to thereby stretch the upper tightly on the last and assemble it in proper position for the subsequent heel seat lasting operation. Since the shoe assembly is clamped at this time between the last supporting plate 56 and the hold-down foot 170, upward movement of the pincers will not shift the last 194.

The pad legs 124 are now caused to move inwardly to cause all of the inner wall of the pad 120 to engage the shoe assembly and, at the same time, pressurized fluid (preferably air) is caused to enter the pad cavity 126 through the line 128 to expand the inner wall of the pad against the shoe assembly. The inflated clamping pad 120 acts to provide a compression molding force on the counter 192 to further mold it to the shape of the last as well as clamping the upper for the subsequent wiping operation. The parts now assume the position shown in FIGURE 16.

After the heel of the shoe assembly is clamped by the inflated clamping pad 120, the wiper supporting slide plate 130 is caused to move forwardly to translate the wipers 136 forwardly from the FIGURE 16 to the FIGURE 17 position so that only the bight of the wiper side surfaces 138 at and adjacent the vertex 140 cross over the last to wipe the upper and counter margins at and adjacent the heel of the last down upon the insole. This is followed by an inward swinging of the wipers 136 about the vertex 140 from the FIGURE 17 to the FIGURE 18 position with no forward translatory movement of the wipers to cause the remainder of the wiper side surfaces 138 to cross over the last and wipe the upper and counter margins upon the insole between the general area of the breastlines of the upper and the portion of the upper engaged by the wipers during the translation of the wipers. The pincers 37 are caused to release the heretofore gripped forepart portions of the upper margin substantially at the time that the wipers commence their inward swinging movement about the vertex 140 and engage the upper margin.

Towards the end of the inward movement of the wipers 136 about the vertex 140, the motor 168 is actuated to retract the piston rod 166 and thereby swing the block 158 together with the hold-down 169 clockwise (FIGURE 5) about the pivot pin 156 and thus raise the hold-down foot 170 so that the motor 22 applies pressure by the shoe assembly directly against the wiper bottoms. At the same time pressurized air under high pressure than had heretofore entered the motor 22 now enters the motor 22 to cause the shoe assembly to be forced against the wiper bottoms under relatively high bedding pressure. At the conclusion of the wiper movement the parts are in the position shown in FIGURE 18. After the wipers have concluded their wiping stroke, they remain in position above the insole with the motor 22 providing bedding pressure for the now wiped upper and counter margins for a predetermined time interval that is sufficient to enable the counter to cool sufficiently to revert to its rigid condition and to enable the adhesive on the counter to cool sufficiently to effect a permanent bond between the upper margin and the insole 196 and between the upper 190 and the liner 191. At the end of this predetermined time interval the machine parts are returned by the machine control system to their idle positions.

Figure 13:
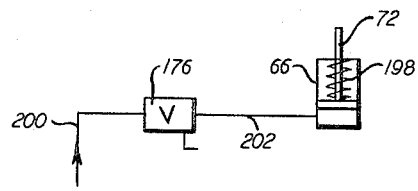
FIGURE 13 is a schematic representation of the control circuit for operating the ejector.

As indicated in FIGURE 13, the return spring 198 of the motor 66 normally maintains the piston rod 72 in the FIGURE 8 position. During the retraction of the hold-down unit 144 by the motor 150, and after the hold-down 169 and wipers 136 have been moved away from over the shoe assembly and the pad 120 has become disengaged from the shoe assembly, the cam 172 engages the roller 88 to thereby depress the plunger 179 until the cam 172 moves past the roller 188 to the FIGURE 4 position to thereby momentarily shift the valve 176. The momentary shifting of the valve 176 enables a pulse of pressurized air to pass from a source, through a line 200 (FIGURE 13), the valve 176 and a line 202 to the motor 66 to momentarily raise the piston rod 72 and thereby move the last ejector 61 from the FIGURE 8 to the FIGURE 10 position.

During the rise of the piston rod 72 the strut 76, ledge 83, lug 84 and bar 88 are translated vertically until the bearing 92 engages the bottom of the slot 90 after which the strut 76 swings counterclockwise (FIGURE 10) about the pin 86 against the force of the spring 94 and the bar 88 swings clockwise (FIGURE 10) about the bearing 92. The bearing 78 enables the piston rod 72 and block 74 to continue their vertical translatory movement while the strut 76 is swinging about the pin 86. During the translatory movement, the ledge 83 engages the downwardly facing surface of the last 194 adjacent the plate 56, as indicated in FIGURES 19 and 19A, and then lifts the last upwardly so that the last has been raised clear of the last pin by the time that the translatory movement is completed. During the swinging movement of the strut 76 the ledge 83 is tilted and the lug 84 engages the last to kick it off the ledge to eject the shoe assembly laterally of the longitudinal center line of the machine into a suitable receptacle (not shown).

It should be understood that the present disclosure is for the purpose of illustration only and that this invention includes all modifications and equivalents that fall within the scope of the appended claims.

I claim:

1. A last ejecting mechanism for use with a last support means that includes a heightwise extending last pin adapted to enter a hole in the last to support the last bottom-up, comprising: a bar, mounted for heightwise movement with respect to said last pin; a ledge normally located below said last; means mounting said ledge to said bar both for heightwise movement in unison therewith and for movement independent of said bar in a direction having a component transverse of said last pin; and drive means operatively connected to said bar and said ledge to initially move said bar and said ledge upwardly in unison to cause said ledge to engage said last and lift said last from said last pin and to thereafter move said ledge independently of said bar and transversely of said last pin to engage and eject said last in a transverse direction.

2. A last ejecting mechanism, for use with a last support that includes a heightwise extending last pin adapted to enter a hole in the last to support the last bottom-up, comprising: a bracket; a bar, having a lost motion connection with respect to the bracket, that is normally located in a lowered position with respect to the bracket, said lost motion connection being so constructed as to permit the bar to be translated heightwise of the bracket in a first direction substantially parallel to the axis of the pin; a strut pivotally connected to the bar for swinging movement in a second direction transversely of the axis of the pin; spring means yieldably urging the strut to a prone position; a ledge on the strut that is normally located at a lower level than the last; a lug on the strut that etxends upwardly of the ledge; a drive rod, mounted for heightwise movement, pivotally connected to the strut; and means for imparting upward movement to the drive rod, whereby the strut is translated upwardly in said first direction until the lost motion connection is taken up by which time the ledge has engaged the last and raised it clear of the pin and the strut is then swung in said second direction against the force of said spring means to enable the lug to engage the last and eject the last laterally of the pin.

3. A last ejecting mechanism, for use with a last support means that includes a heightwise extending last pin adapted to enter a hole in the last to support the last bottom-up, comprising: a bracket adapted to be mounted on the last support means; a drive rod mounted on the bracket for heightwise movement in a first direction parallel to the axis of the pin; a block secured to the top of the rod; a strut pivoted to the block for swinging movement in a second direction that is transverse to the axis of the pin; a bar pivoted to and depending from the strut; a slot in the bar having an axis that normally extends in said first direction; a bearing extending through the slot into the bracket so constructed as to enable the bar to move heightwise with respect to the bearing until the bearing reaches an end of the slot; a finger on the strut positioned in alignment with the block; a spring extending between the strut and the bar yieldably urging the finger against the block; a ledge on the strut; a lug on the strut that extends upwardly of the ledge; means for normally positioning the drive rod in a lower position wherein the bar is in a lower position with the bearing engaging the top of the slot, the strut is in a prone position with the finger bearing against the block and the ledge is located at a lower level than the last; and means for imparting upward movement to the drive rod in said first direction, whereby the strut is translated upwardly in said first direction until the bearing engages the bottom of the slot by which time the ledge has engaged the last and raised it clear of the pin and the strut is then swung in said second direction against the force of said spring to enable the lug to engage the last and eject the last laterally of the pin.

4. A lasting machine comprising: a support for supporting a shoe assembly that includes a last having a shoe upper mounted thereon and an insole located on its bottom so that a selected portion of the margin of the upper may be wiped against a corresponding portion of the insole; ejector means actuable to eject the shoe assembly from the support; control means operable to actuate the ejector means; a hold-down instrumentality mounted for relative movement with respect to the support between an inoperative position remote from the shoe assembly and a working position wherein it bears against the insole to clamp the shoe assembly between the support and the hold-down instrumentality; a pressing instrumentality mounted for relative movement with respect to the support between an inoperative position remote from the shoe assembly and a working position wherein it bears against said upper portion to press said upper portion against the last; a wiping instrumentality mounted for relative movement with respect to the support between an inoperative position remote from the shoe assembly and a working position wherein it moves through a wiping stroke to wipe said margin portion against said insole portion; means for initially maintaining each of said instrumentalities in their relative inoperative positions with respect to the support; means for imparting relative movement between the support and said instrumentalities to bring said instrumentalities into their working positions with respect to the support to thereby clamp the shoe assembly between the support and the hold-down assembly, cause said pressing instrumentality to press said upper portion against the last and cause said wiping instrumentality to effect its wiping stroke; means operative thereafter to impart relative movement between each of said instrumentalities and said support to return each of said instrumentalities to their inoperative positions with respect to the support; and means operative in response to the relative return of said instrumentalities to their inoperative positions with respect to the support to operate said control means and thereby actuate the ejector means.

5. A lasting machine comprising: a support for supporting a shoe assembly that includes a last having a shoe upper mounted thereon and an insole located on its bottom so that a selected portion of the margin of the upper may be wiped against a corresponding portion of the insole; an ejector mounted for movement between an inoperative position and a working position wherein it engages the shoe assembly and ejects it from the support; a motor connected to the ejector to effect its movements; means for normally maintaining the motor in such condition that the ejector is in its inoperative position; control means operable to actuate the motor to move the ejector from its inoperative to its working position; a hold down instrumentality mounted for relative movement with respect to the support between an inoperative position remote from the shoe assembly and a working position wherein it bears against the insole to clamp the shoe assembly between the support and the hold-down instrumentality; a pressing instrumentality mounted for relative movement with respect to the support between an inoperative position remote from the shoe assembly and a working position wherein it bears against said upper portion to press said upper portion against the last; a wiping instrumentality mounted for relative movement with respect to the support between an inoperative position remote from the shoe assembly and a working position wherein it moves through a wiping stroke to wipe said margin portion against said insole portion; means for initially maintaining each of said instrumentalities in their relative inoperative positions with respect to the support; means for imparting relative movement between the support and said instrumentalities to bring said instrumentalities into their working positions with respect to the support to thereby clamp the shoe assembly between the support and the hold-down assembly, cause said pressing instrumentality to press said upper portion against the last and cause said wiping instrumentality to effect its wiping stroke; means operative thereafter to impart relative movement between each of said instrumentalities and said support to return each of said instrumentalities to their inoperative positions with respect to the support; an actuating member so positioned so as to be intersected by one of said instrumentalities during its return to its inoperative position; and means responsive to the intersection of the actuating member during the return of said one of said instrumentalities to actuate the control means and thereby cause the ejector to move to its working position.

6. In a lasting machine: a support, mounted for heightwise movement, for supporting bottom-up a shoe assembly that includes a last having a shoe upper mounted thereon and an insole located on its bottom so that a selection portion of the margin of the upper may be wiped against a corresponding portion of the insole; a hold-down foot, positioned higher than the support, mounted for movement between a rearward out-of-the-way position and a forward working position above the support; means for initially maintaining the support in a lower position wherein the shoe assembly is placed on the support and the shoe upper is stretched about the last; means for initially maintaining the hold-down foot in its rearward position so that it will not interfere with the placement of the shoe assembly on the support or the stretching of the upper about the last; ejector means actuable to eject the shoe assembly from the support; control means operable to actuate the ejector means; means for moving the hold-down foot from its rearward to its forward position; means for thereafter raising the support to clamp the shoe assembly between the support and the hold-down foot after which said margin portion is wiped against said insole portion; means operable subsequent to the wiping of said margin portion against said insole portion to lower the support and to return the hold-down foot to its rearward position; and means effective during said return of the hold-down foot to operate said control means.

7. In a lasting machine: a support, mounted for heightwise movement, for supporting bottom-up a shoe assembly that includes a last having a shoe upper mounted thereon and an insole located on its bottom so that a selected portion of the margin of the upper may be wiped against a corresponding portion of the insole; a frame; a slide mounted in the frame, at a higher level than the support, for movement between a rearward out-of-the-way position and a forward working position; a hold-down foot so mounted on the slide so that it is above the support when the slide is in its working position; means for initially maintaining the support in a lower position wherein the shoe assembly is placed on the support and the shoe upper is stretched about the last; means for initially maintaining the slide in its rearward position so that the hold-down foot will not interfere with the placement of the shoe assembly on the support or the stretching of the upper about the last; an ejector mounted for movement between an inoperative position and a working position wherein it engages the shoe assembly and ejects it from the support; a motor connected to the ejector to effect its movements; means for normally maintaining the motor in such condition that the ejector is in its inoperative position; control means operable to actuate the motor to move the ejector from its inoperative to its working position; means for moving the slide from its rearward to its forward position to thereby position the hold-down foot above the shoe assembly; means for thereafter raising the support to clamp the shoe assembly between the support and the hold-down foot after which said margin portion is wiped against said insole portion; means operable subsequent to the wiping of said margin portion against said insole portion to lower the support and to return the slide to its rearward position; an actuating member so position as to be intersected by the slide during its return to its rearward position; and means responsive to the intersection of the actuating member by the slide during its return to actuate the control means and thereby cause the ejector to move to its working position.

References Cited by the Examiner

UNITED STATES PATENTS

| 1,843,231 | 2/1932 | Jorgensen | 12—1 |
| 2,908,921 | 10/1959 | Kant | 12—1 |
| 2,974,335 | 3/1961 | Frampton | 12—126 |

PATRICK D. LAWSON, *Primary Examiner.*